US008250040B2

(12) United States Patent
Murphy et al.

(10) Patent No.: US 8,250,040 B2
(45) Date of Patent: Aug. 21, 2012

(54) STORAGE OR REMOVAL ACTIONS BASED ON PRIORITY

(75) Inventors: Elissa S. Murphy, Seattle, WA (US); John D. Mehr, Kenmore, WA (US); Matthew J. Dickson, Sammamish, WA (US); Catherine Claire Marshall, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 12/484,979

(22) Filed: Jun. 15, 2009

(65) Prior Publication Data

US 2010/0318575 A1   Dec. 16, 2010

(51) Int. Cl.
    G06F 7/00   (2006.01)
    G06F 17/00  (2006.01)
(52) U.S. Cl. . 707/662; 707/695; 707/802; 707/E17.005; 707/E17.007; 715/764; 715/769; 726/1; 726/7; 726/30; 711/E12.001
(58) Field of Classification Search ............ 707/770, 707/802, 803, 805, E17.005, E17.007, 662, 707/695, 812; 709/224; 711/162, E12.001; 715/769, 764; 726/1, 7, 30
    See application file for complete search history.

(56) References Cited

U.S. PATENT DOCUMENTS

| | | | |
|---|---|---|---|
| 6,141,445 A | | 10/2000 | Castelli et al. |
| 6,493,725 B1 * | | 12/2002 | Iwai et al. ............. 707/E17.005 |
| 6,493,791 B1 * | | 12/2002 | Akkary ........................ 711/108 |
| 6,658,000 B1 * | | 12/2003 | Raciborski et al. ... 707/E17.108 |
| 6,983,331 B1 * | | 1/2006 | Mitchell et al. ........ 707/E17.121 |
| 7,174,305 B2 * | | 2/2007 | Carruthers et al. ......... 705/14.52 |
| 7,460,149 B1 | | 12/2008 | Donovan et al. |
| 7,558,856 B2 | | 7/2009 | Moulton et al. |
| 2004/0003398 A1 * | | 1/2004 | Donian et al. .................. 725/34 |
| 2004/0031058 A1 * | | 2/2004 | Reisman ....................... 725/112 |
| 2004/0088331 A1 * | | 5/2004 | Therrien et al. .............. 707/200 |
| 2004/0243540 A1 * | | 12/2004 | Moskowitz et al. .............. 707/1 |
| 2006/0020973 A1 * | | 1/2006 | Hannum et al. ................. 725/46 |
| 2006/0161635 A1 * | | 7/2006 | Lamkin et al. ................ 709/217 |
| 2006/0168451 A1 * | | 7/2006 | Ishibashi et al. .............. 713/176 |
| 2007/0083571 A1 * | | 4/2007 | Meller et al. .................. 707/203 |
| 2007/0250901 A1 * | | 10/2007 | McIntire et al. .............. 725/146 |
| 2008/0155623 A1 * | | 6/2008 | Ota ............................... 725/109 |

(Continued)

OTHER PUBLICATIONS

Charles Rich and Candace L. Sidner—"COLLAGEN: A Collaboration Manager for Software Interface Agents"—User Modeling and User-Adapted Interaction vol. 8, Nos. 3-4, 315-350, 1998, Kluwer Academic Publishers. Printed in the Netherlands.*

(Continued)

Primary Examiner — John E Breene
Assistant Examiner — Anh Ly
(74) Attorney, Agent, or Firm — Lee & Hayes, PLLC

(57) ABSTRACT

Techniques for providing content management services are described. Managing content services includes determining a value of content and determining storage actions of the content based on the value. The value of the content is determined by weighting factors, such as access frequency, a rating, a size of the content, a type of the content, and a security level of the content. Based on the value of the content, one or more storage actions may be determined for the content to optimize storage. The storage actions may include identifying a version of the content to be saved, compressing the content, determining a back up of the content to store, identifying a location to store the content, performing erasure encoding of the content, and/or removing the content.

11 Claims, 6 Drawing Sheets

U.S. PATENT DOCUMENTS

| | | | |
|---|---|---|---|
| 2008/0201386 A1* | 8/2008 | Maharajh et al. | 707/201 |
| 2008/0215509 A1* | 9/2008 | Charlton | 726/1 |
| 2008/0301164 A1 | 12/2008 | Isobe | |
| 2008/0320222 A1* | 12/2008 | Dhodapkar | 711/E12.001 |
| 2009/0063727 A1 | 3/2009 | Nakamura et al. | |
| 2009/0089303 A1 | 4/2009 | Slik et al. | |
| 2009/0132621 A1 | 5/2009 | Jensen et al. | |
| 2009/0177965 A1* | 7/2009 | Peralta et al. | 715/716 |
| 2009/0248602 A1* | 10/2009 | Frazier | 706/46 |
| 2010/0250497 A1* | 9/2010 | Redlich et al. | 707/E17.005 |

OTHER PUBLICATIONS

Cristina Cerschi Seceleanu (Abo Akademi University and TUCS)—"Formal Development of Real-time Priority-based Schedulers"—Proceedings of the 12th IEEE International Conference and Workshops on the Engineering of Computer-Based Systems (ECBS'05)—2005 IEEE Apr. 4-7, 2005 (pp. 263-270).*

Addis et al., "Sustainable Archiving and Storage Management of Audiovisual Digital Assets" retrieved at <<http://www.avatar-m.org.uk/wp-content/uploads/2009/04/addisibc2008.pdf>>, Presented at IBC 2008, September, Amsterdam, pp. 1-8.

DNS, "Storage Virtualisation", retrieved at <<http://www.dnsarrow.co.uk/virtualisation/whitepapers/Storage_Virtualisations_16pp_HR.pdf>> on Aug. 4, 2009, 14 pgs.

Phunchongharn et al., "File Type Classification for Adaptive Object File System", retrieved at <<http://ieeexplore.ieee.org/stamp/stamp.jsp?arnumber=04142399>>, IEEE, 2006, pp. 1-4.

* cited by examiner

STORAGE OR REMOVAL ACTIONS BASED ON PRIORITY

BACKGROUND

A wide range of conventional network services are being offered to users by service providers. The conventional network services offered are typically hosted and run on servers to provide the users remote access and storage for applications, files, multimedia, photos, and the like. The conventional network services allow users to access to applications, documents, and other files, and to conduct various activities, while storing files and making backup copies of the files on the servers. Problems that occur for the conventional network service providers are deciding whether to save information on the servers, determining a length of time to save the information, and managing an overwhelming amount of files and backup copies on various servers. So as not to deprive users of important documents or treasured photos, the conventional service providers typically attempt to store multiple copies of users' documents in their original form. However, the cost of maintaining information in this manner is costly, especially considering that a vast majority of information stored by the service providers is seldom if ever accessed.

Another problem is consumption of expensive resources for the service providers, such as bandwidth. This may present a problem when transmitting information by incurring excessive costs or causing delays for retrieval of information to the users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes providing content management services, for example, to provide access to content for a wide range of services for users at a remote location. Managing the content includes generating a value of the content and determining storage actions to be performed on the content. The value of the content is to be generated based on several weighting factors of the content. Once the value of the content is generated, the storage actions that are to be performed on the content are based on this value. Furthermore, the value of the content may be prioritized as well as the storage actions that are to be performed. In some implementations, the content may additionally or alternatively be removed or deleted based on the value of the content.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
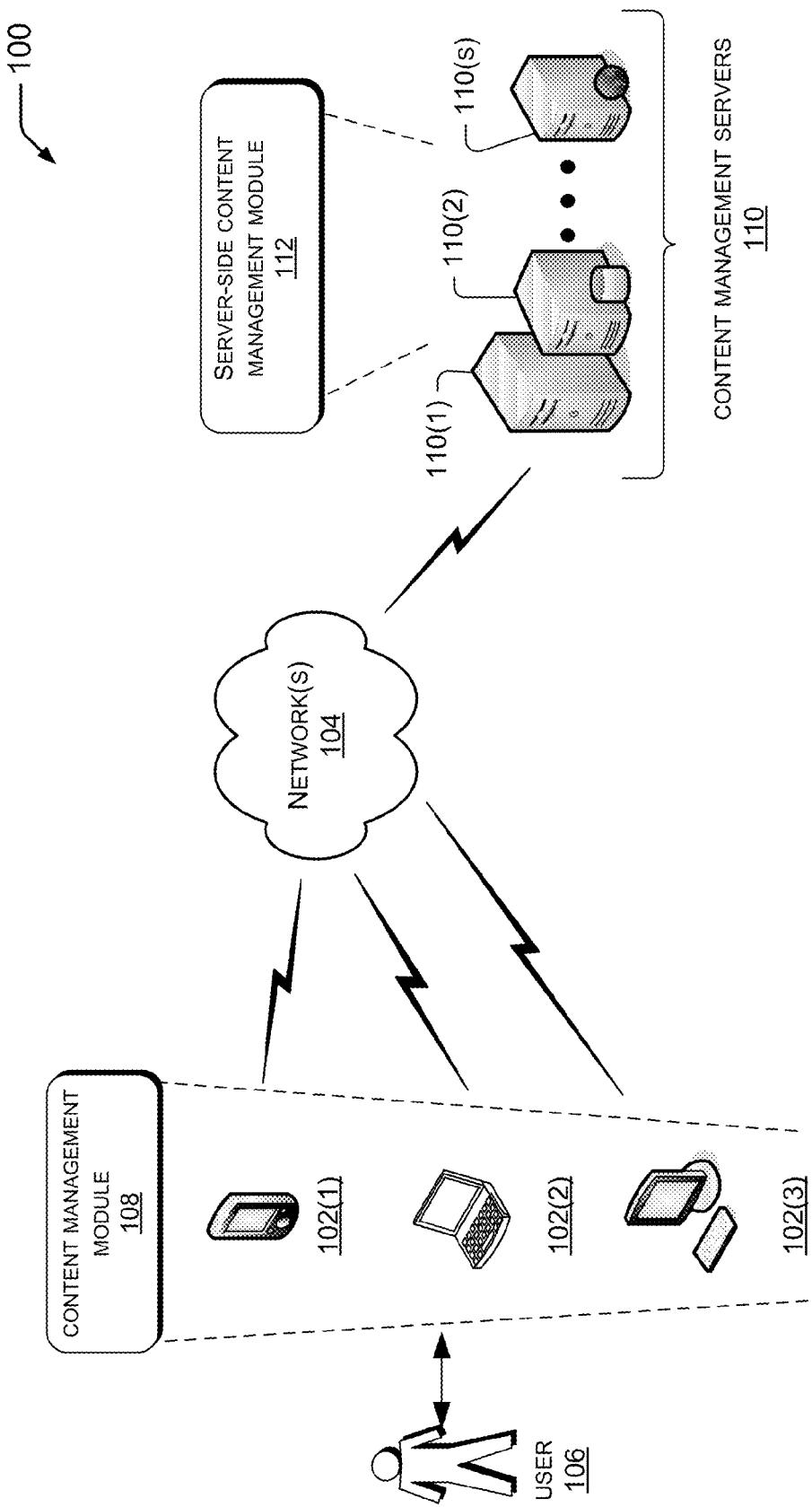
FIG. 1 is a schematic showing an exemplary environment for managing content through a web browser on computing devices.

As discussed above, conventional network services may not always provide an effective way of storing and retrieving information on servers. For example, in some instances (e.g., duplicate files from multiple computing devices or multiple versions of files), it may be difficult to determine which information to save and a time period to save the information. Moreover, conventional network services may not be able to readily distinguish between the multiple versions or the duplicate files (e.g., a user saving several versions from different computing devices). This disclosure describes various exemplary ways of managing content services, for example, by identifying the content that is to be stored and determining ways to store the content more efficiently and with less redundancy.

This disclosure describes various techniques for managing the content to allow users with computing devices to access the content by way of one or more remote servers. By way of example and not limitation, the content may include applications, services, documents, data, graphs, photos, multimedia (e.g., text, audio, images, animation, video), games, emails, online chat records, social networking profiles, postings, and other files that users may wish to store.

In an implementation, the content management service determines a prioritizing value of the content and determines storage actions to be performed on the content based on the prioritizing value. The prioritizing value of the content is based on weighted factors of the content. By way of example and not limitation, the weighted factors of the content may include an access frequency of the content, a subjective rating of the content by the user, a level of security of the content determined by the user, a size of the content, a type of the content, and a service level agreement between the user and a service provider. Furthermore, the process may determine storage actions to be performed on the content belonging to the user based on the prioritizing value of the content provided by the weighted factors.

In another implementation, the content management service determines the storage actions to be performed on the content based at least in part on generating weighted factors of the content. By way of example and not limitation, the storage actions include storing the content on the server, compressing the content, backing up or identifying a version of the content to store, specifying a storage location for the content, and performing an erasure encoding on the content. Thus, by performing the storage actions, the content may be, among other things, saved, compressed, backed up, or erasure encoded. In some implementations, the content may be removed or deleted based at least in part on the weighted factors of the content.

In yet another implementation, the computing device of the user may visually present a representation of the content identified on a user interface, before determining the value of the content, before performing the storage actions, and/or before performing a removal or deletion of the content. This visual representation allows the user to visually provide guidance on the value of the content and to verify that the correct content will be saved, compressed, backed up, erasure encoded, or removed.

While aspects of described techniques can be implemented in any number of different computing systems, environments, and/or configurations, implementations are described in the context of the following exemplary computing environment.

Illustrative Environment

FIG. 1 is a block diagram of an exemplary environment 100, in which content management services may be accessed from a web browser on a computing device. The environment 100 includes exemplary computing devices 102(1), 102(2), 102(3), which may take a variety of forms, including, but not limited to, a portable handheld computing device 102(1) (e.g., a personal digital assistant, a smart phone, a cellular phone), a laptop computer 102(2), a desktop computer 102(3), a media player, a digital camcorder, an audio recorder, a camera, or any other device capable of connecting to one or more network(s) 104 to access content management services. The exemplary computing devices 102(1), 102(2), 102(3) may be used by a user 106 to connect to one or more network(s) 104.

The network(s) 104 represents any type of communications network(s), including wire-based networks (e.g., cable), wireless networks (e.g., cellular, satellite), cellular telecommunications network(s), and IP-based telecommunications network(s) (e.g., Voice over Internet Protocol networks). The network(s) 104 may also include traditional landline or PSTN network(s), or combinations of the foregoing (e.g., Unlicensed Mobile Access or UMA networks, the circuit-switched telephone networks or IP-based packet-switch networks).

In the illustrated example, the computing devices 102 include a content management module 108 to implement the management of content services. The content management module 108 interacts with an array of resources available via the network(s) 104 and may include a plurality of network service providers, online merchants, internet portals, web sites, and the like.

The environment 100 includes the one or more content management servers 110(1), 110(2), . . . , 110(S) which may be a representative set of servers that is accessible via the network(s) 104. The content management servers 110 may be independent servers, or a collection of servers that are configured to perform larger scale functions (e.g., a server farm or datacenter) accessible by the network(s) 104. In the illustrated example, the servers 110 represent private multiple content servers to implement functionalities, such as send, receive, route, store, detect, track, or otherwise manage content of the computing devices 102. Thus, the content management servers 110 may be administered or hosted by a network service provider that provides content management services to and from the computing devices 102.

The servers 110 include a server-side content management module 112, which represents functionality to perform management of content services to and from the computing devices 102. The server-side content manager module 112 executing at the servers 110(1)-110(S) provides content management services via network(s) 104, to manage the services and to provide access to the services, to interact with the computing devices 102, and the like. Furthermore, the server-side content manager module 112 may incorporate functionality to provide services to the computing devices 102, including determining a value of the content, saving the content on the servers 110, backing up the content on the servers 110, and the like.

In the illustrated example shown in FIG. 1, the user 106 operates multiple computing devices 102 to connect via the network(s) 104 to the servers 110. In this example, the content management module 108 on the computing device 102 provides access to the content and services, such as applications, games, emails, or multimedia, located on the servers 110. The server-side module 112 is capable of retrieving the content, from the servers 110 and of providing access to the items to the computing devices 102. The server-side module 112 may provide the content in response to user requests, or may manage the content on a pre-determined basis, such as saving or backing up the content every night from the computing devices 102 to the servers 110.

In the illustrated example, the content management module 108 enables the computing devices 102 to access one or more content management servers 110 at remote locations. In some instances, the content management module 108 may be executed with the server-side content management module 112 to monitor ongoing access of the content, communication, and activities between the computing devices 102 and the content management servers 110. The content management module 108 and/or the server-side content management module 112 may record the frequency access of the content on the server 110 by the user 106 or an approved third party.

The content management module 108 and/or the server-side content management module 112 may differentiate accessibility of the content between a full access/read of the content versus a logical container (e.g., a folder) that is currently being read. For example, the user 106 is looking for the content or at the content that is located in a same folder adjacent to a given object. The content management module 108 and the server-side content management module 112 may assign a slightly higher priority to the object, assuming the logical hierarchy/folders have meaning to the user 106.

Exemplary Computing Device

Figure 2:
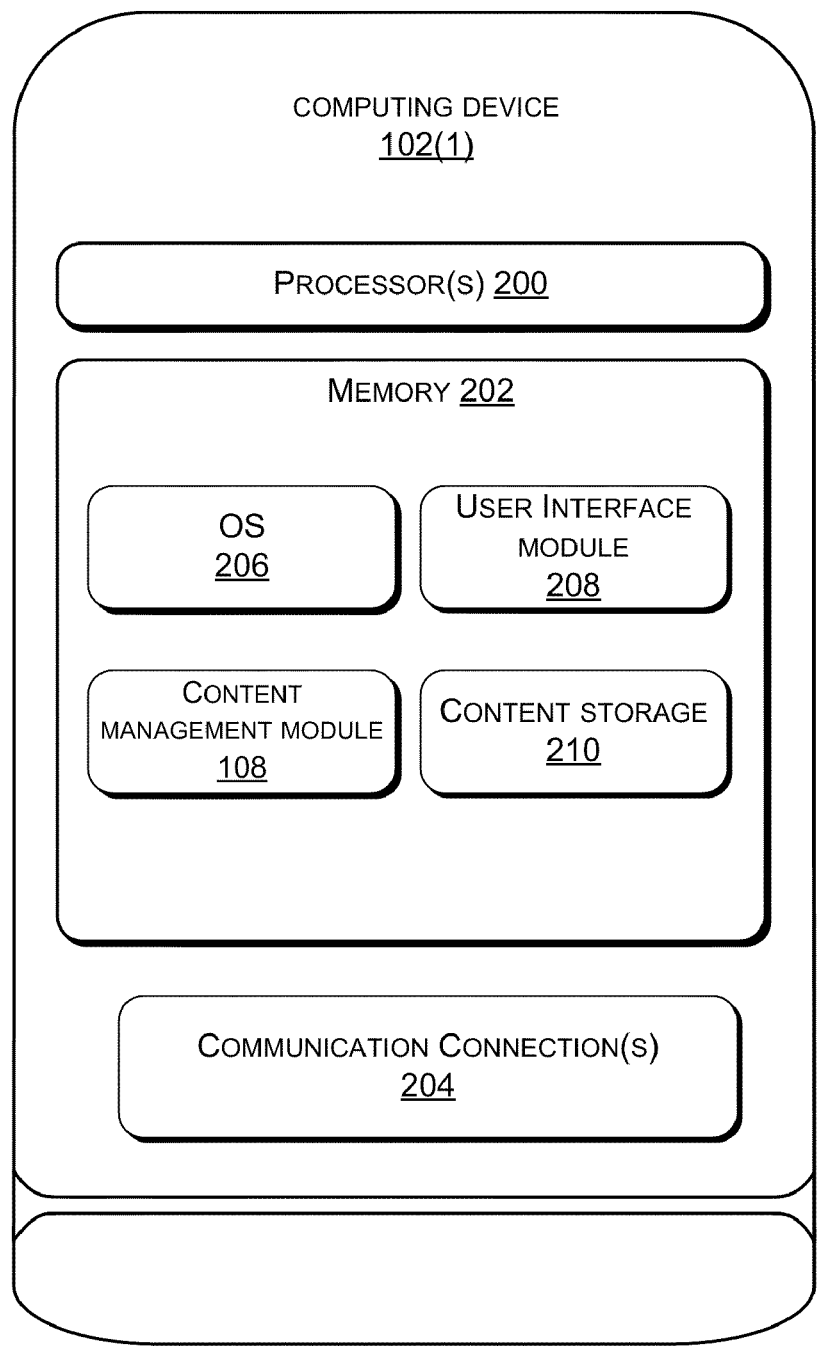
FIG. 2 is a block diagram showing an exemplary computing device usable to access the content and to save the content, in the environment of FIG. 1.

FIG. 2 is a block diagram showing an exemplary communication device, such as the computing device 102(1). As shown, the computing device 102(1) includes a processor 200, a memory 202, and one or more communication connections 204.

The memory 202 includes an operating system 206 and a user interface (UI) module 208 that, when executed on the processor 200, collectively facilitate presentation of a user interface on a display of the computing device 102(1). The computing device 102(1) of the user 106 may, in some implementations, visually present a representation of the content that is to be rated by the user 106 and/or to be assigned a security level by the user 106. The information provided by the user 106 is used in assessing a value of the content. This visual representation of the content allows the user 106 to visually verify that the content has been correctly identified or rated. Furthermore, in some implementations, the computing device 102(1) may visually present a representation of copies, duplicates, or versions of the content to be selected for storage or removal actions. The visual representation of the selected content also allows the user 106 to visually verify that the correct content will be saved, compressed, backed up, erasure encoded, or removed.

The computing device 102(1) may provide a visual representation of the actions that have been performed and completed of the content. For example, by providing the visual representation to the user 106 to illustrate that the content is safe, the content is protected, or the content is backed-up. This provides assurance to the user 106 of content preservation and availability of the content. By visually verifying that the content is safe, protected, or backed-up, helps the user 106 know what content is available and where the content is located.

The memory 202 includes the content management module 106 for implementing the content management services and a content storage 210 for locally storing one or more items of the content. Storing the content on the content storage 210 offers the user 106 accessibility to the content if there is no network service available. As mentioned, the servers 110 will host some content, such as applications, games, emails, multimedia, and may store some or all of the content, based on a service level agreement between the network service provider and the user 106.

The memory 202 may also include one or more other applications or modules (not shown) for implementing various other functionality, such as an email application, a word processing application, a spreadsheet application, a media player application, a calendar application, a navigation module, and the like.

The communication connection(s) 204 may include a wide area network (WAN) module, a local area network module (e.g., WiFi), a personal area network module (e.g., Bluetooth), and/or any other suitable communication modules to allow the computing device 102(1) to communicate over the network(s) 104.

Exemplary Server Implementation

Figure 3:
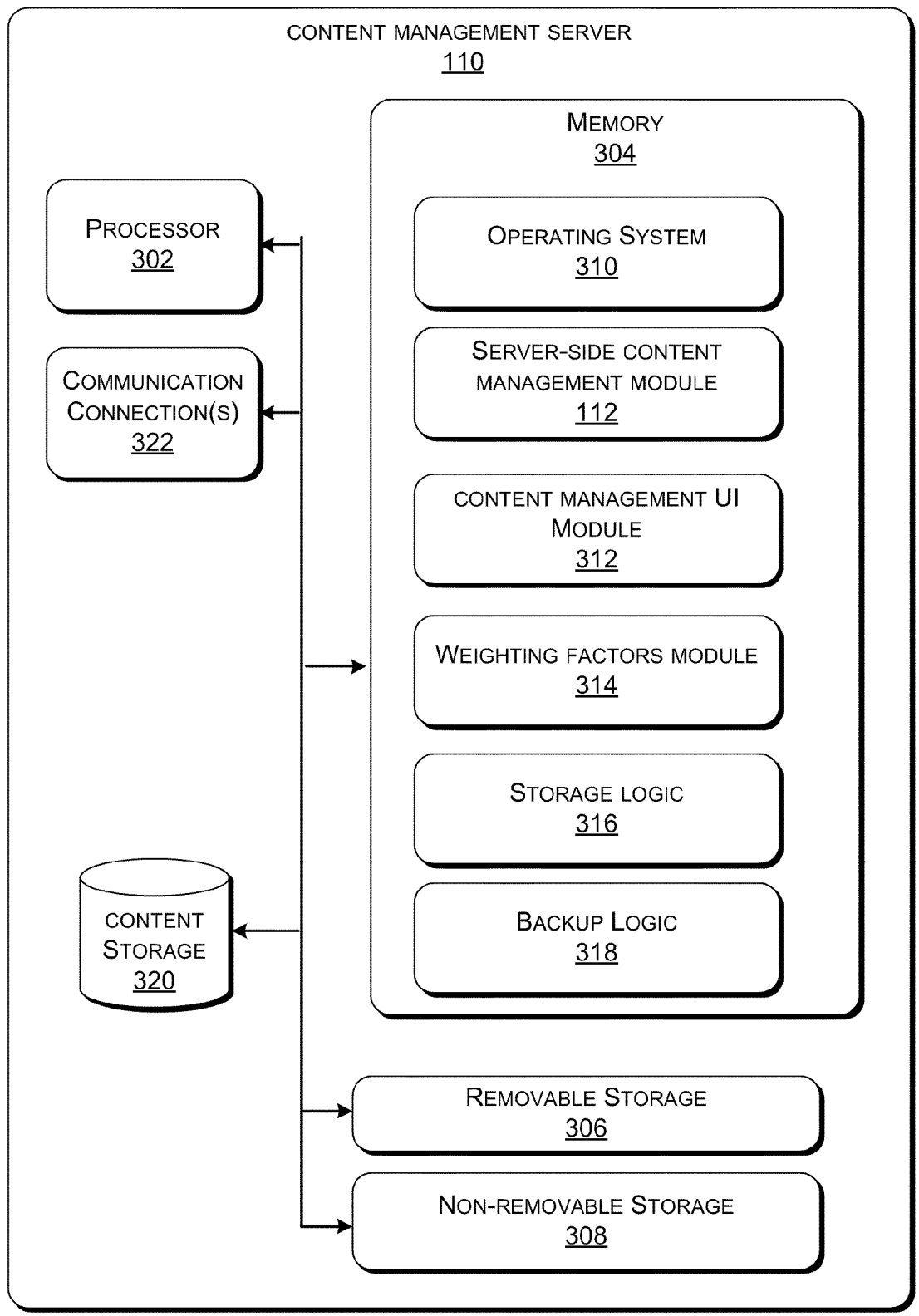
FIG. 3 is a block diagram showing an exemplary content management server usable with the environment of FIG. 1.

FIG. 3 is a schematic block diagram showing details of an exemplary content management server 110. The content management server 110 may be configured as any suitable system capable of managing content, which includes, but is not limited to, receiving, routing, storing, serving, tracking, detecting, backing up, moving, migrating, sharing, and removing the content. In one exemplary configuration, the content management server 110 comprises at least one processor 302 and a memory 304. The content management server 110 may also include additional removable storage 306 and/or non-removable storage 308.

Turning to the contents of the memory 304 in more detail, the memory 304 may store an operating system 310, the server-side content management module 112, a content management user interface module 312, and one or more applications for implementing all or a part of the content management services. The server-side management module 112 may also communicate with the content storage 210 on the computing devices 102, and/or other network storage (not shown). The content management user interface module 312 facilitates a representation of the content on a display of a user interface to receive selections from the user 106 to identify ratings or levels for the weight factors of the content and to determine the storage or the removal actions of the content. The server-side content module 112 and the content UI module 312 may be stored on the content server 110, in addition to or instead of the individual computing devices 102.

The one or more other applications or modules (not shown) for implementing all or part of the content management services, may also implement various other functionality, such as an email application, a word processing application, a spreadsheet application, a media player application, a calendar application, a navigation module, a game, online services, and the like. The memory 304 in this implementation also includes a weighting factors module 314, a storage logic 316, a removal logic 318, a content storage 320, and a communication connection(s) 322.

The weighting factors module 314 provides a plurality of factors, which may be used to compute a value of the content based on assigning weights to the factors of the content. The weights may be preconfigured by the service, may be specified by the user 106 ahead of time (e.g., during set up of the service) or upon execution of the service, and/or may be refined based on access and usage history of the user or multiple users (e.g., wisdom of crowds). The weighted factors module 314 identifies the plurality of factors to be weighted, which include but are not limited to, identifying an access frequency of the content based on actions of the user or the identified/authorized third party, determining a subjective rating of the content specified by the user, evaluating a level of security of the content specified by the user, establishing a size of the content, determining a type of the content, and determining a subscription level between the user and the service provider. The subscription level for online storage may range from a free service with limited storage, a flat fee for a certain amount of storage, and a sliding scale depending on the needs of the user 106. In some implementations, the weighting factors content module 314 may determine a priority of the content based on the weighted factors described above. Thus, based on results of the weight factors, suitable storage or removal actions of the content may be implemented.

In some implementations, the weighted factors module 314 may provide a plurality of factors based on different attributes that are identified by the service provider or in combination with the user 106. In some implementations, the weight factors module 314 may identify new factors to be added by tracking a user's activities, identify factors that are no longer applicable to be removed, and provide different weights to a plurality of factors based on an order of risk, or a user's activities. For example, the service or the user 106 may assign a higher or give more weight for a particular factor than for the other factors. In some instances, the factor assigned with the higher weight may be the level of security associated with the content (e.g., such as tax returns, wills, and/or titles for homes and automobiles). In another example, the service or the user 106 may assign a lower or less weight for the factor of rating the type of content (e.g., associated with online chat records). The weighted factors module 314 may provide updates to the weighted factors in response to a change in the factors, on a pre-determined time interval, such as every x hours or days, or in response to receiving a request for the weighted factors from the storage logic 316 or the removal logic 318.

The storage logic 316 provides suitable storage options for the content based at least in part on the weighted factors or the priority of the content. The storage logic 316 manages storage options for the content, such as the content from the computing devices 102, the content stored in the content storage 210, and the content stored in the server-side content storage 320. In particular, the storage logic 316 determines the storage actions that are to be performed on the content based on the weighted factors or the priority of the content and then performs the storage actions. The storage actions to be performed are optimized and reliable, without being expensive to the user 106 or time consuming for transmission. The storage logic 316 may also communicate with one or more local and/or remote servers, and/or other network storage (not shown) to identify storage locations.

The storage logic 316 identifies a plurality of storage actions for the content, which include but are limited to, storing the content by identifying a version of the content to store on the server 110, compressing the content by performing a lossless or a lossy compression, performing a content integrity check, performing a backup of the content to store, performing a format translation, performing a resolution reduction, identifying a location to store the content, and performing erasure encoding on the content. Examples of storage options for the content include backing up the content with multiple copies for treasured items (e.g., family photographs), performing lossy compression on the content that do not need to be retained in an original format (e.g., email), and no longer storing the content but, rather deleting the content after a pre-determined time (e.g., seven years for tax returns).

Compressing the content takes up less storage space and uses less bandwidth for transmission from the content management servers 110. The two compression methods are lossless compression or lossy compression. Lossless compression allows an exact original content to be reconstructed from the compressed content when it is important that the original and the decompressed content be identical. For example, this may apply towards text and financial content. Lossless compression may be applied to the content based on a threshold value. If there is no threshold value, then lossy compression is applied to the content. Lossy compression only allows an approximation of the original content to be reconstructed, in exchange for better compression rates. For example, this may apply towards audio and video, which may be compressed down to a small percent or a small size of the original size of the content.

Checking content integrity ensures the content is good, valid, consistent, or complete (e.g., checksum). Checking the content integrity is performed as a function based on the value of the content. In some instances, content integrity may be compromised in a number of ways, during transfer, storage, or retrieval to and from the computing device 102(1) to the content management server 110. The integrity of the content may be determined by computing a checksum (e.g., a fixed-sum of the content) and then recomputing another checksum to compare to the stored checksum. If there is a match in the checksum numbers, such as the numbers are the same, this indicates the content was not altered or likely to be free or errors. However, if there is not a match in checksum numbers, such as the numbers are different, the content was altered or there is error associated with the content. Thus, in order to preserve the content for its intended use, content integrity may be performed to ensure the content is complete without errors introduced during transmission or storage.

Performing a backup of the content is one way to protect valuable content. Backup occurs by copying the content from the computing devices 102 to the content management servers 110 over the network(s) 104, in case of computer theft, viruses, or hard disk loss on the computing devices 102.

Performing a format translation is another option to protect valuable content. The translation includes identifying a format of the content sent from the computing device 102(1) and received by the server-side content management module 112. The translation allows the content that is received to be translated to a common file format for storage. Alternatively, the translation may involve translating the content to an intermediate format and sending the content to a location in the intermediate format. Upon receiving the content in the intermediate format by the server-side management module 112, translate the content in the intermediate format to a specific format for storage.

Performing a resolution reduction of the content takes up less storage space (e.g., resolution used as pixel count, pixel per length, pixel per area unit, or pixel per inch in imaging). The content received by the server-side content management module 112 may include images, such as digital images, film images, and other types of images. In some instances, higher resolution of the content requiring more image details may be desired for valuable content, such as originals, personal photographs, family videos, and the like. While a lower resolution may be desired for lower valued content, such as photographs received from a social networking site, videos from a parade, copies of images, modified images, and the like. For example, the photographs that have been modified on the computing device 102(1) may be reduced to a lower resolution. This reduced resolution content may further be compressed, if desired.

Identifying a location to store the content may be based on classifying the content into groups or organization structure, by identifying predefined user roles, by using access control policies, and the like. The content may be stored on different servers depending on the size, the accessibility, and the like.

Erasure encoding replicates a portion of the content, rather than the whole content. By replicating the portion of the content, storage is more efficient at the content management servers 110 and more reliable by placing the content in different storage locations and accessibility of the content is much easier. Erasure encoding is one way of optimization to keep content availability high. Thus, erasure encoding reduces a total amount of space required to store the same number of replicates for regeneration of the content.

Furthermore, the storage logic 316 in combination with the server-side content management module 112 and the content management UI module 312 may present a visual representation of the content before performing the storage actions. This visual representation allows the user 106 to visually verify that the correct content will be saved, compressed, backed up, or erasure encoded.

In some implementations, the storage logic 316 may identify new storage actions to be performed, identify storage actions that are no longer applicable to be removed from the list of available storage options, and provide the priority for the storage actions based on other attributes. The storage logic 316 may change the manner of storing the content in response to the change in the value of the weighted factors, may perform storage actions on a pre-determined time interval, such as every X hours or days, or in response to receiving a request to perform storage of the content, from the server-side content management module 112 or the client-side content management module 108. The storage options described save storage space on the content management servers 110, reduce the cost of managing the content service to the user 106, and reduce the energy consumption, without sacrificing service quality to the user 106.

The removal logic 318 identifies the content that is to be removed, eliminated, or deleted, such as the content from the server-side content storage 320. In particular, the removal logic 318 determines removal or deletion actions that are to be performed on the content based on at least in part on the weighted factors or the priority of the content. The removal logic 318 interacts with the weighting factors module 314 and the storage logic 316 to determine the content to be removed or deleted. The removal logic 318 in combination with the server-side content management module 112 and the content management UI module 312 may present a visual representation of the content before performing the removal or deletion actions. This visual representation allows the user 106 to visually verify that the correct content will be removed or deleted from the server 110.

The server 110 may also contain communications connection(s) 322 that allow the processor 302 to communicate with the computing devices 102, other network servers, network storage, and/or other devices on the network(s) 104.

The server 110 may also include one or more known input device(s), such as a keyboard, mouse, pen, voice input device, touch input device, etc., and output device(s), such as a display, speakers, printer, etc. All these devices are well known in the art and are not discussed at length here.

Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The content management server as described above may be implemented in various types of systems or networks. For example, the content management server may be a part of, including but not limited to, a client-server system, a peer-to-peer computer network, a distributed network, an enterprise architecture, a local area network, a wide area network, a virtual private network, a storage area network, and the like.

Exemplary Processes

Figure 4:
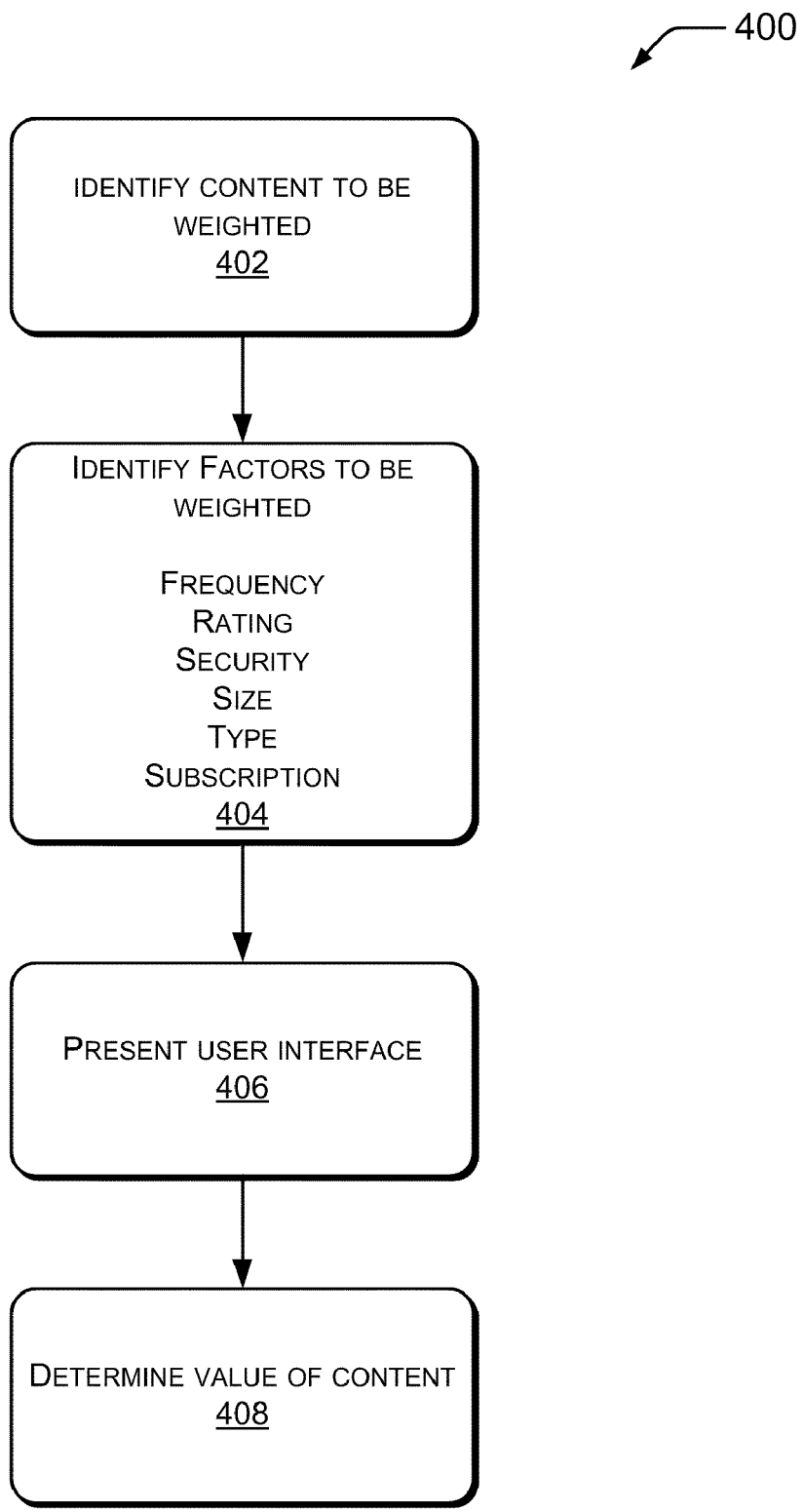
FIG. 4 is a flowchart showing an exemplary process of determining a value of the content based on weighted factors.
Figure 5:
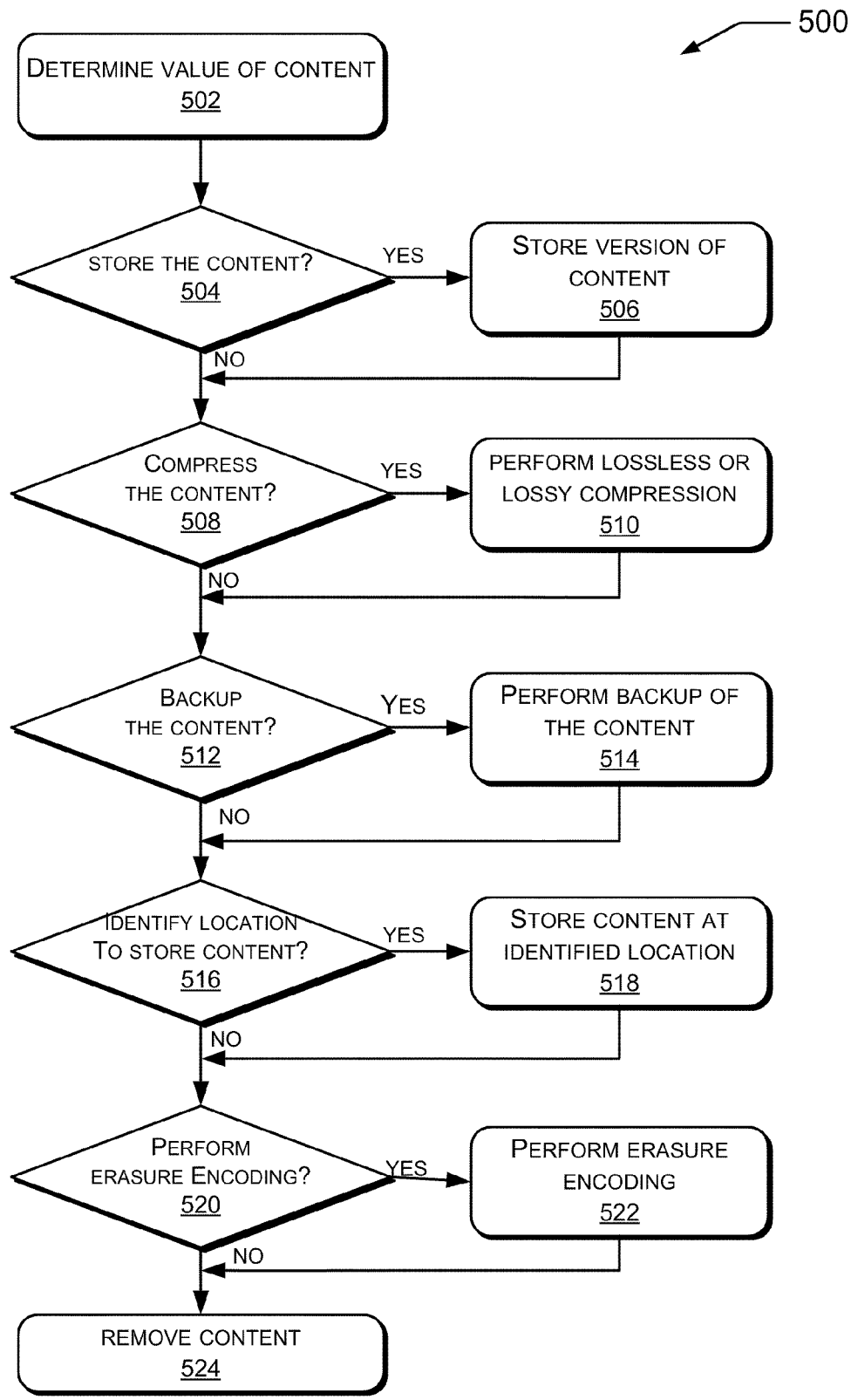
FIG. 5 is a flowchart showing an exemplary process of determining storage or removal actions of the content based on the value.

FIGS. 4-5 are flowcharts showing exemplary processes for determining the value of the content by the weighted factors and determining the storage or the removal actions to be performed on the content based on at least in part of the value. The processes are illustrated as a collection of blocks in logical flowcharts, which represent a sequence of operations that can be implemented in hardware, software, or a combination. For discussion purposes, the processes are described with reference to the computing environment 100 shown in FIG. 1, the computing device 102 shown in FIG. 2, and the content management server 110 shown in FIG. 3. However, the processes may be performed using different environments and devices. Moreover, the environments and devices described herein may be used to perform different processes.

For ease of understanding, the methods 400 and 500 are delineated as separate steps represented as independent blocks in FIGS. 4 and 5 However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

FIG. 4 is a flowchart illustrating an exemplary process 400 of determining the value of the content (e.g., the content of personal interests that are specific to the user 106 versus word processor or spreadsheet applications). Upon identifying the content that is to receive a value 402, the process proceeds to identifying the plurality of weighted factors at block 404.

For illustrative purposes, a table below shows the factors that may be weighted in generating the value of the content. In some implementations, there may be an option to detect duplicate content or derivative content. The detection of the duplicate content or the derivative content may affect the weight of the content due to the existing redundancy, depending on where the duplicate content or the derivative content is located. In another implementation, the detection of the duplicate or the derivative content may promote the weighting of the duplicate or the derivative content towards being deleted or purged based on the user 106 preference. In some implementations, the weight of the factors may be assigned by the network service providers and/or in combination with feedback provided by the users.

| Exemplary Table of Weighted Factors | | | | | | | |
|---|---|---|---|---|---|---|---|
| Content | Frequency | Rating | Security | Size | Type | Subscription Level | Score |
| Weights | (.30) | (.20) | (.15) | (.10) | (.10) | (.15) | |
| Content A | X | | Y | Z | | | AA |
| Content B | M | S | | | T | U | BB |
| Content C | H | | | | I | | CC |
| Content D | | R | | N | F | G | DD |
| ... | | | | | | | |

As illustrated above, the server-side content management module 112 identifies the plurality of factors to be weighted, which include but are not limited to, identifying the access frequency of the content based on actions of the user 106 and/or the approved (e.g., identified or authorized) third party, determining the subjective rating of the content specified by the user 106, evaluating the level of security of the content specified by the user 106, establishing the size of the content, determining the type of the content (e.g., file format), and determining the subscription level between the user 106 and the online service provider.

The exemplary table indicates the weights totaling to a sum of 100%. However, there may be an user "override" feature allowing the users to specify certain factors as being "required" (e.g., such as do not delete or remove personal photographs). An explanation of the plurality of factors follows below.

The access frequency of the content is determined by the actions of the user 106 and/or the approved third party. Their actions of when accessing the content on the servers 110 may be monitored by the client side content management module 108 and the server-side content management module 112. The access frequency of the content may be monitored during a pre-determined time interval, for example, approximately the prior three months to monitor the user's and/or the third party's history of accessing the content at the servers 110. For example, the access frequency of the content at the servers 110 may be collected during a first record at the prior three months, at a second record at the prior six months, and the like.

The access frequency of the content may be monitored based on differentiating whether the content is being accessed or read versus the folder being read (e.g., a parent object). The access frequency may monitor a logical hierarchy/folders, giving the parent object a higher priority. Furthermore, the access frequency may include identifying whether the user 106 has viewed, manipulated, or modified the content.

Another factor is the rating of the content as specified by the user 106. For example, the user 106 may rate the content that has important or personal value (e.g., a will, treasured family photos, a favorite song) as having a high rating compared to other content pertaining to the user 106. In some implementations, the content may be rated in a scale ranging from a number of one to five, with five being the highest rating for importance or of personal value or in a scale ranging from a number of one to three, with three being the highest rating for importance or of personal value.

Another factor is specifying the security level by the user 106. For example, the user 106 may rate the content that is highly confidential (e.g., a document with competitive prices for a contract, tax returns, or credit card numbers) as high security, while the content that is not confidential (e.g., an audio recording) as low security. In implementations, the content may be given different security levels (e.g., one to three or one to five, as in the previous example). In addition, different security levels may be established by the user 106 for different types of content (e.g., all tax return documents are given a high security level, while all audio recordings are given a low security level).

Another factor is establishing the size of the content by the server-side content management module 112. The size of the content may be compared against a predetermined threshold size. The size of the content may affect a storage capacity or a bandwidth amount required to transmit the content during content retrieval. All other factors being equal, content over a certain size may be compressed, may be stored locally at the client device rather than being archived at the network servers 110, and/or fewer copies of the content may be backed up.

Another factor is determining the type of the content by the server-side content management module 112. The type of the content may range from word processing documents, images, and others. The content type may be defined based on the class of content (e.g., primarily textual, primarily audio, primarily video, multimedia), or may be based on file type (e.g., based on file extension). The type of the content may also affect the storage capacity or bandwidth amount required to transmit the content during retrieval.

Another factor is determining the subscription level between the user 106 and the online service provider. Subscription levels for online storage may range from a free service with limited storage, a flat fee for a certain amount of storage, and a sliding scale depending on the needs of the user 106.

At block 404, once the factors have been identified, a representation of the content that may need to be rated by the user 106 is visually presented to the user 106. The user 106 provides the rating, the security level, and/or the subscription level (e.g., if information is not readily available) to be used in assessing the value of the content. This visual representation of the content allows the user 106 to visually verify that the content has been correctly identified or rated.

At block 408, the value of the content based on the weighted factors is determined by the weighted factors module 314 located on the content management server 110. The process 400 provide updates to the weighted factors in response to a change in the factors, collecting information of the factors on a pre-determined time interval, such as every X hours or days, or in response to receiving a request for the weighted factors from the storage logic 316 or the removal logic 318. In some instances, the process 400 may determine the priority content based at least in part on the weighted factors.

The weighted factors may be updated by adding new factors or removing some or all of the factors that have been previously identified based on behavioral history and machine learning. For example, the process may add or remove factors by evaluating other users' access frequencies and their use history (e.g., wisdom of crowd). In another example, the process may update the weighted factors by machine learning based on the user's behavioral history and the wisdom of the crowd. As mentioned, in some implementations, the process may identify new factors to be added by tracking the user' or the third party's activities or behavioral patterns, identify the weighted factors that are no longer applicable to be removed or given less weight, and evaluate the weights for the factors by readjusting the weights to the plurality of factors, if applicable.

FIG. 5 is a flowchart illustrating an exemplary process 500 of determining the storage actions or the removal actions of the content at the servers administered by the content management service, such as the content management servers 110. At block 502, the value of the content based on the weighted factors is determined by the weighted factors module 314 located on the content management server 110. The process 500 proceeds to determine individual storage actions and removal actions based on the value of the content.

At block 504, the process 500 identifies whether to store the content on the content management servers 110. If, at block 504, the content is to be stored on the content management servers 110, at block 506, the content management servers 110 store a latest version of the content and proceeds to block 508. The server-side content management module 112 tracks and manages multiple versions of a single instance of the content. By performing this function, the server-side content management module 112 ensures that the latest version of the content is saved, unless directed to store one or more other versions in addition to or instead of the latest version. However, there may be occasions when the latest version is not desired, in which case "file versioning" may be desired to allow the user 106 to retrieve previous versions of the content from a selected point. If the content is not to be stored at block 504, but to be stored on the content storage 210 of the computing device 102, the process proceeds directly to block 508.

At block 508, the process 500 identifies whether to compress the content on the content management servers 110. If, at block 508, the content is to be compressed based on the value of the content, the process proceeds to block 510 where the content is to be compressed by a lossless compression or a lossy compression on the content management servers 110. Depending on the value of the content, lossless or lossy compression may be applied. Lossless compression allows an exact original content to be reconstructed from the compressed content when it is important that the original and the decompressed content be identical, or when no assumption can be made on whether certain deviation is uncritical. Lossy compression only allows an approximation of the original content to be reconstructed, in exchange for better compression rates. Lossless compression is used in many applications. For example, it is used in the popular ZIP file format. It is also often used as a component within lossy content compression technologies. If the content is not to be compressed at block 508, the process proceeds directly to block 512.

At block 512, the process 500 identifies whether to backup the content based on several conditions on the content management servers 110. One condition that may cause backup of the content may be that the user 106 has specifically identified and/or marked that the content is to be backed up (e.g., pictures folder, personal photographs). Another condition that may cause backup of the content may be based on the aggregate weighting of the content is considered valuable. The backup operation is taken on behalf of the user 106 to prevent loss of valuable content that may be sensitive or important content (e.g., credit reports, banking information, tax information). Another condition that may cause backup of the content may be that no version of the content has been backed up previously. This content is not identified as sensitive or critical, but is frequently accessed by the user 106 and/or the third party (e.g., content is considered "hot"). In this instance, the hot content may be backed up until the hot content is no longer frequently accessed by the user 106 and/or the third party (e.g., considered cold content).

If, at block 508, the content is to be backed up by the content management servers 110, at block 514, the content management servers 110 may provide a backup copy of the content. In some instances, there may be another backup copy of the content made at a different server than the server that has saved a backup of original content. After making the backup copy at block 514, the process proceeds to block 516. Saving the backup of the original content and the another backup copy at different servers, ensures that the backup of the original content and the another backup content are not both destroyed in case of fires or natural disasters that may occur.

Backing up the content refers to making duplicate copies of the content in case of events (e.g., natural disasters, accidental deletion, corrupted information) that may cause the original content to be lost. For example, if there was a natural disaster or an earthquake that destroyed the user's content on their computing device 102, backup copies of the content on the servers 110 would be available to restore the original. Typically, the backup copies remain unchanged for a long period of time, such as six months or longer. If the content is not to be backed up or the latest version is not to be saved at block 512, the process proceeds directly to block 516.

At block 516, the process 500 identifies a location to store the content on the content management servers 110. At block 518, the content management servers 110 store the content at the identified location, and the process proceeds to block 520. In some instances, the content may be stored through use of pointers, by storing a uniform resource identifier (URI) or other pointer to content stored elsewhere in the set of servers 110 or in another location accessible via the network(s) 104. For example, where content is readily available from a relatively static site accessible via the network 104, it may be sufficient to include a link to the content instead of storing an actual backup copy. In some implementations, the content may be stored across several servers 110. The location where the content is stored should be easy to access (e.g., to keep productivity up at work). If the content has not been stored at block 504 and there has been no location identified to store the content at block 516, the process proceeds with the content directly to block 520.

At block 520, the process 500 identifies whether to perform erasure encoding on the content based on several conditions at the content management server 110. One condition for performing erasure encoding is that the aggregate weighing of the content identifies the content as valuable. Thus, erasure encoding is performed on behalf of the user 106 to prevent loss of this valuable content. Another condition for performing erasure encoding is that no version of the content has been erasure encoded or backed up previously. While the content may not be considered valuable, the content is considered "hot" due to the frequent access by the user 106 and/or the third party. In this instance, erasure encoding is performed on the hot content until the hot content is no longer frequently accessed by the user 106 and/or the third party (e.g., cold content). As previously mentioned, erasure encoding is an optimization to keeping the content availability high.

At block 522, the process performs erasure encoding on the content and proceeds directly to block 524. Erasure encoding refers to transforming a message of N blocks into a message with more than N blocks, to recover the original message from a subset of those blocks. Erasure encoding replicates a portion of the content, rather than the whole content. By replicating the portion of the content, storage is more effective on the content management servers 110 and more reliable by placing the content in different storage locations and accessibility of the content is much easier. If, at block 520, erasure encoding is not to be performed by the content management servers 110, the process proceeds directly to block 524.

At block 524, the process has identified whether the content should be removed, deleted, or eliminated based on several conditions and whether the content has been saved, compressed, backed up, or erasure encoded. One condition for removing, deleting or eliminating the content may be for reducing redundancy for balancing efficiency and availability with cost for storing the content. Another condition for removing, deleting, or eliminating the content may be that the user 106 identifies or marks the content is to be deleted.

At block 524, the process determines whether the content should be removed or deleted. Content replication refers to storing multiple copies of the same content on multiple different servers of the set of servers 110(1) . . . 110(S). Some amount of replication and redundancy is desirable for backup to guard against catastrophic failure. However, in some cases, more than a desired number of copies of the content may be stored locally on the device 102, on the servers 110, or in the aggregate. This may occur, for example, if the user 106 accesses the content on multiple computing devices 102, storing the content on the computing devices 102 and the content management servers 110. For example, the user 106 may have saved three copies of the content on each of the computing devices 102(1), 102(2), and 102(3), and saved another four copies of the content on the content management servers 110, for a total of seven copies of the content that is administered by the content management service. However, it is only desirable to maintain four copies of the content, so three copies of the content may be deleted by the content management service, since three copies of the content are considered redundant. In cases, where there is redundant content, removal, deletion, or elimination of the redundant content may be performed at 524.

In some implementations, the operations described above may be performed on duplicate content or derivate content. For instance, there may be a thumbnail generated for a photograph as an operation on the content management server 110. The thumbnail provides recognizability to the user 106 by providing faster view scenarios for web site(s). However, since there may be original representations of the operations available, it may be more efficient to remove or to delete the thumbnails, particularly when the thumbnails are of less value to the system overall. This value is based on a function of the original content or as a function of a type of the derivate content.

Figure 6:
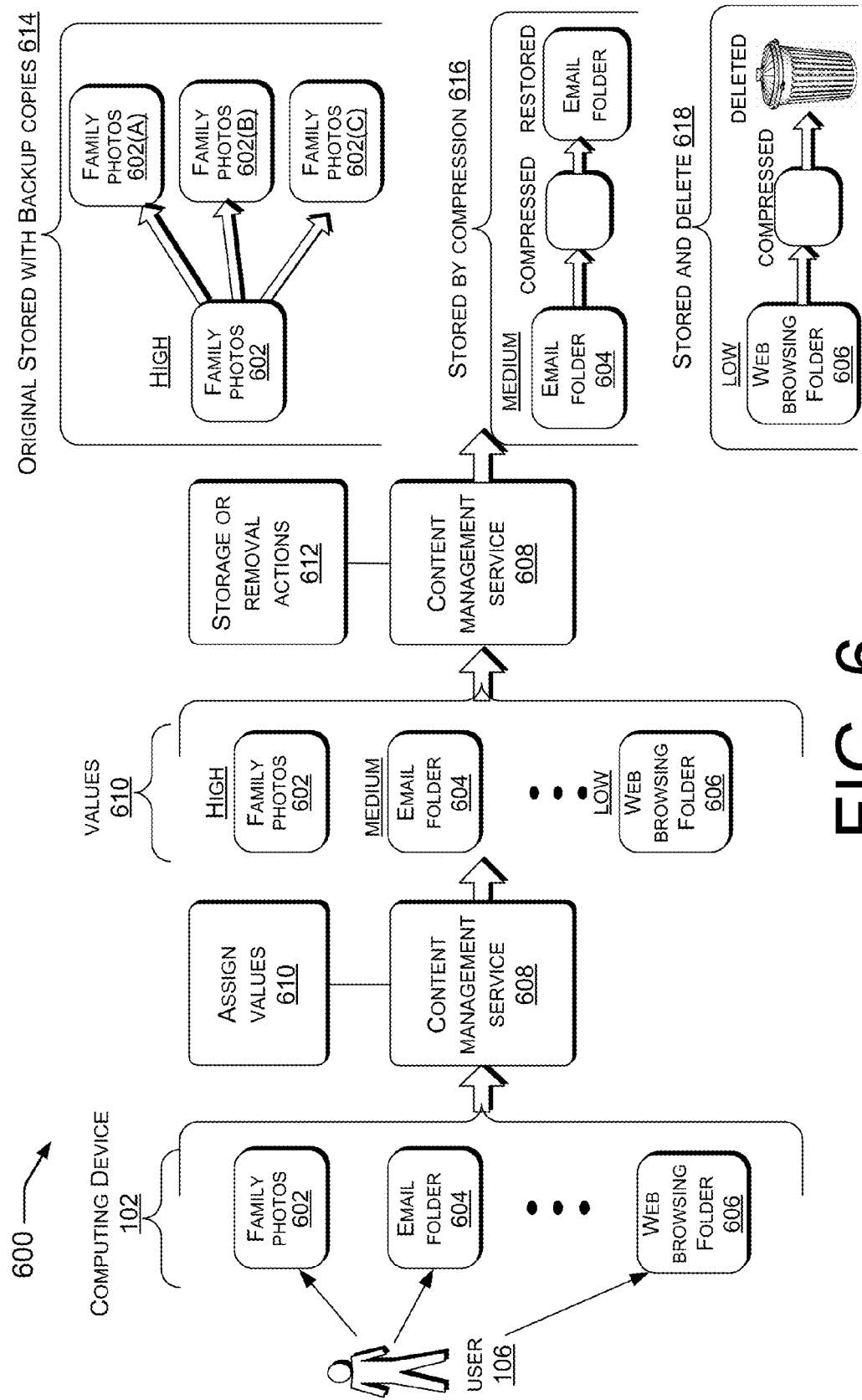
FIG. 6 is a schematic showing an exemplary process of managing the content by assigning values of the content and applying the storage or removal actions.

FIG. 6 is a flowchart illustrating an exemplary process 600 of managing the content by assigning values of the content and applying the storage or removal actions on the content. In the illustrated example, the user 106 has three items of content on their computing device 102, family photos 602, an email folder 604, and a web-browsing folder 606. Through functionality of the content management module 108 on the computing device 102, the user 106 accesses the content management service 608.

Upon identifying the three items of content that are to be assigned values 610, the process 600 proceeds to assigning values based at least in part on the plurality of weighted factors to the family photographs 602, the email folder 604, and the web browsing folder 606. For simplicity sake, the weighted factors described in FIGS. 3-4 are applied here, thus values 610 are assigned to the three items of content. For example, the values 610 are indicated as "high" indicating of high importance or of high value for the family photos 602, "medium" indicating of some value for the email folder 604, and "low" indicating of low importance or low value for the web-browsing folder 606.

Next in the process 600, the content management service 608 applies the storage or removal actions 612 on the three items of content. Turning to the family photos 602, the content management service 608 determines that the family photos 602 are of high value 610 and may store the original and with multiple backup copies 614 on the content management servers 110. The content management service 608 saves the original family photos 602 in their original format to ensure the stored content is of the same quality and makes three backup copies of the family photos, 602(A), 602(B), and 602(C), that made be stored on different servers. For example, family photos 602(A) may be stored on the content management server 110(1) and family photos 602(B) may be stored on the content management server 110(2).

The second item is the email folder 604 that the content management service 608 determines to be of medium value. The content management service 608 may store the email folder 604 by compression 616. As mentioned previously, compression may be lossless or lossy compression. Since the email folder 604 is of primarily of textual content, the content management service 608 performs a lossless compression on the content in the email folder 604. The content in the email folder 604 is compressed to save storage space on the content management servers 110 and is able to be restored to its original format. For example, the content may be stored as compressed content with little or fewer copies stored on the content management servers 110.

The third item is the web-browsing folder 606 that the content management service 608 determines to be of low value. The content management service 608 may be stored and deleted 618. For example, the content in the web browsing folder 606 is compressed to be stored, no copies made or stored, and the content that have not have been accessed may be deleted from the content management servers 110.

As discussed above, certain acts in processes 400, 500, and 600 need not be performed in the order described, may be modified and/or may be omitted entirely, depending on the circumstances. The storage options described save storage space on the content management servers 110, reduce the cost of managing the content service to the user 106, and reduce the energy consumption, without sacrificing service quality to the user 106.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented at least partially by a processor, the method comprising:
   prioritizing content by determining a value of the content, the determining the value of the content being based on one or more of:
      identifying an access frequency of the content based on actions of a user, the access frequency comprising a number of times the content has been accessed during a predetermined time;
      evaluating a level of security of the content;
      establishing a size of the content, the size being compared with a predetermined threshold size;
      determining a subscription level of the user; and
   managing the content based at least in part on the prioritized content by performing storage actions including:
      identifying a version of the content to save on a server;
      compressing the version of the content saved on the server;
      backing up the content;
      identifying a location to store the content;
      performing erasure encoding of replicated portions of the content: and
      removing copies of the content from the server based at least in part on the prioritized content.

2. One or more computer-readable media encoded with instructions that, when executed by a processor of a server, perform acts comprising:
   identifying, by the processor, content to which to apply storage actions;
   collecting, by the processor, a value of the content based on weighting factors, the weighting factors comprising:
      an access frequency of the content;
      a rating of the content provided by a user;
      a security level of the content;
      a size of the content;
      a type of the content; and
      a subscription level of the content;
   determining, by the processor, storage actions to be performed on the content based at least in part on the value of the content;
   performing the storage actions on the content based on a scheduled time occurring at a predetermined interval;
   visually displaying a representation of the content on a user interface of a computing device, the user interface usable to select the content; and
   deleting the content that is selected based at least in part on the value of the content and a selection of the content.

3. The computer-readable media of claim 2, wherein the storage actions to be performed comprise identifying a version of the content to save on a server.

4. The computer-readable media of claim 2, wherein the storage actions to be performed comprise compressing the content by a lossless compression based on a threshold value, or otherwise, compressing the content by a lossy compression.

5. The computer-readable media of claim 2, wherein the storage actions to be performed comprise backing up the content to store on a server.

6. The computer-readable media of claim 2, wherein the storage actions to be performed comprise identifying a location on a set of servers to store the content.

7. The computer-readable media of claim 2, wherein the storage actions to be performed comprise performing erasure encoding of the content.

8. A system comprising:
   memory;
   a processor coupled to the memory to perform acts comprising:

identifying, by the processor, content to which to apply storage actions;

generating, by the processor, a value for the content based on weighting factors for the content, the weighting factors including one or more of:

a frequency at which a user accesses the content, the frequency including a number of times the content has been accessed during a predetermined time, a level of security of the content as specified by a user, a size of the content compared to a predetermined threshold size, a subscription level at which a user has agreed to with a service provider; and determining, by the processor, the storage actions to be performed on the content based at least in part on the value of the content, the storage actions comprising:

identifying a version of the content to store on a server;

compressing the version of the content saved on the server;

performing a back up of the content to store;

identifying a location to store the content;

performing an erasure encoding of repeated portions of the content and removing copies of the content from the server based at least in part on the content.

9. The system of claim 8, wherein the weighting factors for the content comprise a subjective rating of the content as specified by a user.

10. The system of claim 8, wherein the weighting factors for the content comprise a type of the content.

11. The system of claim 8, further comprising managing the content by removing copies of the content stored on a server, the content based at least in part on the weighted factors for the content.

* * * * *